United States Patent [19]

Miller et al.

[11] Patent Number: 5,099,399
[45] Date of Patent: Mar. 24, 1992

[54] HIGH EFFICIENCY FIBER OPTICS ILLUMINATOR WITH THERMALLY CONTROLLED LIGHT GUIDE BUSHING

[76] Inventors: Jack V. Miller; Ruth E. Miller, both of 700 N. Auburn Ave., Sierra Madre, Calif. 91204

[21] Appl. No.: 681,732

[22] Filed: Apr. 8, 1991

[51] Int. Cl.⁵ .................................. F21V 7/04
[52] U.S. Cl. ................................ 362/32; 362/294; 385/15; 385/53; 385/133
[58] Field of Search .............. 362/32, 96, 294, 373, 362/345; 350/96.1, 96.15, 96.18, 96.2, 96.25, 96.28, 96.27

[56] References Cited

U.S. PATENT DOCUMENTS

| | | | |
|---|---|---|---|
| 3,446,952 | 5/1969 | Sitter et al. | 362/32 |
| 3,681,592 | 8/1972 | Hugelshofer | 362/32 |
| 3,770,338 | 11/1973 | Helmuth | 362/32 |
| 4,321,659 | 3/1982 | Wheeler | 362/294 |
| 4,496,211 | 1/1985 | Daniel | 350/96.28 |
| 4,704,660 | 11/1987 | Robbins | 362/32 |
| 4,747,660 | 5/1988 | Nishioko et al. | 350/96.25 |
| 4,786,127 | 11/1988 | Molnar | 362/32 |
| 4,883,333 | 11/1989 | Yanez | 350/96.15 |
| 4,922,385 | 5/1990 | Awai | 362/294 |
| 4,986,622 | 1/1991 | Martinez | 362/32 |

Primary Examiner—Ira S. Lazarus
Assistant Examiner—D. M. Cox

[57] ABSTRACT

A fiber optics illuminator includes a source of illumination on an optical axis and an optical element coaxially disposed on the optical axis, forming an image of the illumination source at an image plane. A housing encloses the source of illumination, the optical element and the image plane. A thermal control bushing is disposed on the optical axis at an exit aperture in the housing and includes an elongated, generally cylindrical glass rod coaxially disposed on the optical axis, having a first end at the image plane of the optical element, receiving illumination and heat, and a second end external to the housing. The thermal control bushing includes a means for dissipating heat from the glass rod by radiation outside the housing and by convection aided by a ventilating fan. An elongated fiber optics light guide has a light receiving end coaxially disposed adjacent to the second end of the glass rod, and a remote light-emitting end. In a preferred embodiment the glass rod includes a series of conjugate refocus planes spaced from the image plane at its light receiving end, and has a length such that the illumination at its light emitting end is substantially out of focus adjacent to the fiber optics light guide.

12 Claims, 1 Drawing Sheet

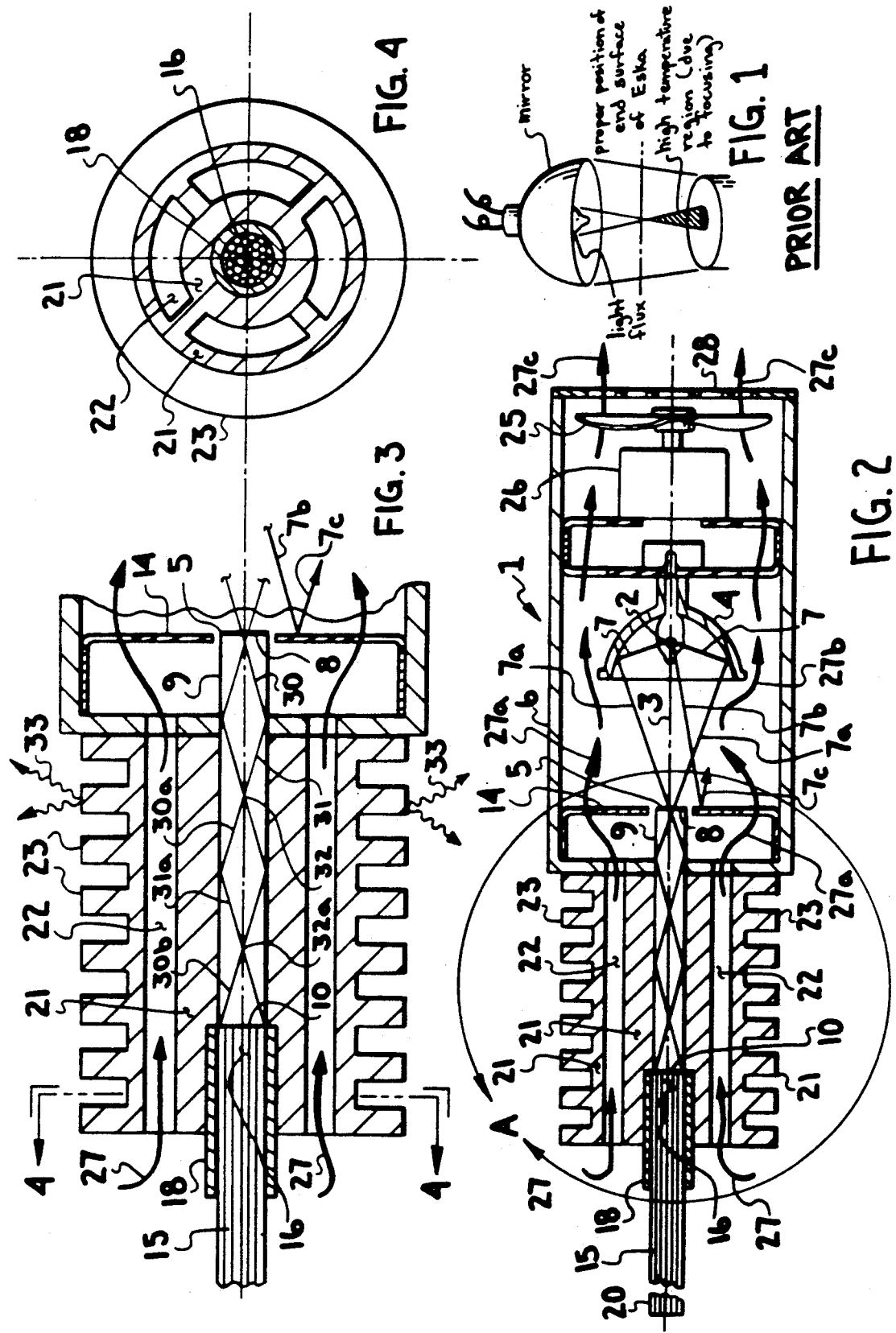

HIGH EFFICIENCY FIBER OPTICS ILLUMINATOR WITH THERMALLY CONTROLLED LIGHT GUIDE BUSHING

BACKGROUND OF THE INVENTION

This invention applies to the field of fiber optics illuminators, and more particular to those illuminators that provide a source of illumination for plastaic fiber bundle light guides.

A principal disadvantage of such currently known fiber optics illuminators is that they produce intense focussed light onto the receiving end of the fiber bundle, which tends to heat, age and often burn the surface of the fiber ends, destroying the light guide prematurely. The recommended maximum continuous operating temperature for commercial plastic optical fibers is 70° C. the fiber ends soften, distort and begin to melt.

Many thermal control methods are presently used to reduce the heat to protect the end of the fiber bundles in state-of-the-art illuminators. One common method is the use of dichroic ellipsoidal reflector lamps, such as the "MR" (Miniature Reflector) halogen lamps that allow a substantial portion of the infrared energy from the lamp to pass through visible-reflectance dichroic glass reflectors instead of being reflected with the visible light into the focussed beam. Experiments by the inventor have shown that such MR lamps with power as low as 42 watts will melt plastic optical fibers at the focal point within 15 seconds.

Another additional method commonly used to reduce the heat in the beam is the use of an infrared reflecting dichroic mirror between the lamp and the fiber bundle. This reduces the visible energy by only about 10%, and has the effect of reducing the heat load so that the 42 watt bulb will melt the plastic fiber ends at the focal point in about 30 seconds.

Some presently used illuminators tilt an infrared-transmitting, visible-light-reflecting dichroic mirror at a 45° angle to the optical axis, but since the mirror is near Brewster's angle, the visible beam energy is reduced by as much as 50%, and the reflected light is strongly polarized by the grazing reflection. The results is reduced thermal energy in the beam, but the technique usually only doubles the time to fiber melting to about 60 seconds.

Another method in common use for thermal control is the use of a relatively high velocity cooling fan to blow air across the end of the fiber bundle. This improves cooling, but such systems still do not preclude fiber burning at the focal point within a relatively short time.

After employing all of the foregoing heat removal methods, presently known fiber optics illuminators take the final step to prevent melting and burning of plastic fibers; they defocus the beam so only a portion of the energy in the visible beam strikes the fiber bundle. This technique is characteristic of all presently known illuminators that use 30 watt lamps or larger to illuminate plastic optical fibers. As a matter of fact, the manufacturers of plastic fibers provide technical manuals for their use which instruct the user not to place the fiber ends at the focus of the optical system. Therefore much of the intentionally-diffused image falls outside the area of the bundle of fibers, resulting in gross optical inefficiency from this cause alone. As a result, the optical efficiency of most typical prior art illuminators is less than 10%.

One reason prior art fiber optics illuminators, even with one or more of the forgoing heat removal methods, continue to overheat the fiber ends is that the fibers are terminated in a bundle that is supported in a rubber compression bushing, much like a rubber chemical bottle stopper with a hole in the center. The bushings in this widely-used practice hold the fibers centered in the aperture of the illuminator, but the rubber is a thermal insulator that precludes the heat generated at the fiber ends from being conducted or radiated out of the fiber bundle.

The basic purpose of the present invention is to provide a fiber optics illuminator in which the focussed energy energy falls substantially on the face of the receiving end of the fiber bundle with minimal spillover losses, without excessive filtering losses, and with fiber operating temperatures within the plastic fiber manufacturers' recommendations.

SUMMARY OF THE INVENTION

The achievement of the foregoing purposes of the invention is accomplished by the preferred embodiment of the present invention in which a fiber optics illuminator includes a source of illumination on an optical axis and an optical element coaxially disposed on the optical axis, forming an image of the illumination source at an image plane. A housing encloses the source of illumination, the optical element and the image plane. An exit aperture through the housing a the image plane receives an elongated light guide comprising one or more optical fibers supported in a thermal control bushing. The bushing includes a light transmitting and heat conducting glass rod on the optical axis having a first end at the focussed image plane and a second end in contact with the optical fibers of the light guide.

The heat conducting element is in thermal contact with the thermal control bushing, whereby heat from the receiving end of the optical fiber light guide is conducted through the heat conducting element and is dissipated from the exterior of the thermal control bushing. In a preferred embodiment the heat conducting element, made of infrared adsorbing glass has a length of at least twice its diameter and includes a series of conjugate refocus planes spaced from the image plane at its first and at the focus, and has a length such that the illumination at its second end is substantially out of focus adjacent to the receiving end of the fiber optics light guide.

BRIEF DESCRIPTION OF THE DRAWINGS

FIG. 1 is a perspective schematic view of the recommended practice for fiber bundle positioning in prior art fiber optics illuminators;

FIG. 2 is a side cross-section view of a preferred embodiment of a fiber optics illuminator according to the present invention FIG. 3 is an enlarged side cross-section of View A of the fiber optics illuminator of FIG. 2; and FIG. 4 is a transverse cross-section view of FIG. 3, taken along section line 4—4 of FIG. 3.

DETAILED DESCRIPTION OF THE DRAWINGS

In FIG. 1 the optical arrangement of a typical prior art illuminator is substantially reproduced from: Technical Manual, Luminous Signs & Displays, Plastic Optical Fiber, ESKA, published by the largest manufacturer of plastic optical fibers, Mitsubishi Rayon Co., Ltd. The illustration shows a source of illumination "light flux" in an ellipsoidal reflector "mirror" and shows the proper position for the end of a plastic fiber optics bundle, well away from the "high temperature region (due to focussing)". The "proper position" is therefore well away from the high light region at or near the conjugate focus of the ellipsoidal reflector.

The ellipsoidal reflector lamp type used for fiber optics illuminators is almost universally the "MR-16" dichroic reflector tungsten-halogen lamp. This lamp type is available from any manufacturers in wattages from 10 watts to 500 watts, and has a glass reflector that is 16/8ths, or 2 inches in diameter, which is the smallest commonly used reflector for fiber optics illumination. These reflector lamps usually have a conjugate focus of 35 to 50 mm, or about 1½ inches from the face of the reflector. These short-focus ellipsoidal lamps are cataloged by most lamp manufacturers as "fiber optics lamps".

It is apparent that in order to position a fiber optics light guide at the plane identified as "proper" in FIG. 1, that the fiber bundle would have to be nearly 2 inches in diameter to intercept the light from the reflector at the plane where the flux density is low enough to avoid melting or burning the fibers, This would be a very large, inflexible column of fibers. It would also be very expensive, since every individual fiber is purchased by the meter or foot, and therefore the larger the bundle, the more costly is the light guide.

The illustration shown in FIG. 1 represents the present state of prior art optical geometry to maintain fiber temperature at or below the 70° C. as recommended by the manufacturer to avoid damage to the fiber ends. The applicant has measured the beam diameters at the fiber bundle entrance ends of most of the commercially available illuminators, and has found that in each case the light beam diameter is much larger than the fiber bundle diameter. As a result, optical efficiencies of less than 10% are common, and as the fiber bundle diameter is made smaller the efficiencies further diminish.

In FIG. 2 the fiber optics illuminator 1 according to the present invention has a light source 2 on an optical axis 3 and operated from a remote source of electrical power which is not shown. An optical element 4 is coaxially disposed on the optical axis 3 and forms an image of the illumination source 2 at an image plane 5. The optical elements is shown as the most commonly used ellipsoidal reflector, but may optionally be an imaging lens or a paraboloidal collimating reflector in combination with a condensing lens, such elements being common in the lighting optics industry.

A housing 6 encloses the source of illumination 2, the optical element 14 and the image plane 5. Direct rays 7 striking reflector 4 at a distance from source 2 become reflected rays 7a which form a central image of source 2 falling on a first entrance end 8 of an a heat absorbing and heat conducting glass rod 9. The rays 7a arriving at image plane 5 enter entrance end 8 and are transmitted through the length of rod 9 to the exit end 10. Additional direct rays 7b from source 2 strike an apertured reflector 14 outside the diameter of rod 9 at image plane 5. to be reflected away from rod 9 as reflected rays 7c.

A fiber optics light guide 15, which may be either one or a plurality of optical fibers in a bundle, is terminated at an entrance end 16 by a metal ferrule 18, so the fiber ends are substantially in thermal contact with the exit end 10 of glass rod 9. Fiber bundle 15 is also provided with a remote end 20. Entrance end 16 of the fiber bundle 15 receives light from the exit end 10 of rod 9, whereby light is transmitted through the length of bundle 15 to be emitted at remote end 20.

Glass rod 9 and fiber optics termination ferrule 18 are also in intimate thermal contact with a thermal control bushing 21, which is provided with one or more axial ventilation passages 22 therethrough and into housing 6, and is also provided with a plurality of cooling fins 23 external to housing 6. Within housing 6 a fan 25 is driven by an externally powered motor 26, which draws external cooling air 27 through ventilation passages 22, past reflector 4 as internal cooling air 27a, through fan 25 to exit housing 6 as exit air 27c emitted through ventilation holes 28.

In FIG. 3, glass rod 9 is shown having its entrance end 8 at the focal plane 5 at which the source of illumination 2 is sharply imaged. This means that the diameter of the beam is as small as possible for the source and reflector used. There will always be some light outside the face 8 of rod 9, which without reflector 4 in place would impinge the sides of rod 9 and impart unnecessary heat without contributing to the useful illumination, such as rays 7b, which are reflected by reflector 14 as reflected rays 7c. In addition, there will always be poorly focused rays, typically reflected from the lamp ellipsoid very near the apex at the lamp, that miss the rod due to optical magnification. However, with rod end 8 at the focus of the ellipsoid and protected by the apertured mirror 14, the maximum optical efficiency is achieved that is consistent with both the light source and its reflector, in conjunction with the rod (and fiber bundle) diameter. The entrance face 8 of rod 9 may also have a heat-reflecting, visible-light-transmitting dichroic coating applied to further reduce the head entering the rod.

As the focussed light enters entrance face 8 of rod 9 the light passes thorugh the focus, and emerges within rod 9 as a expanding cone of light at the angle of rays 7a diminished by the index of refraction of the glass selected. The cone of light 30 expands until it reaches the diameter of rod 9, at which point internal reflection converts the expanding cone 30 into a focussing cone of light 31 to a conjugate focus 32. Again the light passes through focus 32 to become another expanding cone of light 30a, which in turn is reflected in focussing cone 31a to another conjugate focus 32a. Once again the light passes through focus 32a to become another expanding cone of light 30b, which intersects the diameter of rod 9 at the exit end 10. As the light progresses through the length of rod 9, much of the infrared energy is absorbed by the glass and conducted to the thermal control bushing 21, to be dissipated by both cooling air 27 moving through passage 22 and radiation 33 from fins 23.

Experiments by the inventor have shown that if the end 16 of fiber bundle 15 is positioned at any one of the focal points, such as image plane 5, or conjugate focus points 32 or 32a of shorter glass rods, the infrared energy in the focussed beam, even when diminished by the absorption of the glass rod 9, will still cause heat building to melt a small central pit into the ends of the plastic fibers. Therefore is is necessary to optically tune the length and diameter of the glass rod to the conical angle of the focussed light from the source reflector. The length of the rod 9 is such that the illumination at its second end 10 is approximately ½ the distance between conjugate focal points, whereby the light beam at the exit end 10 is substantially out of focus. In this arrangement, the rod and fiber bundle may be small in diameter, still efficiently accept a high percentage of the light in the most sharply focussed beam, but still have the light distributed over the entire area of the fiber bundle end 16.

Although some heat will be conducted from fiber and 16, through ferrule 16 to the thermal control bushing 21, the plastic fiber bundle will always have a much higher infrared absorption than the glass rod. Therefore there is still a tendency for the entrance ends of the plastic fibers to accumulate heat. This is in part due to the very high thermal insulation property of plastic, wherein heat flow into and across the fibers is minimal. For this reason the end 16 of the fibers in the plastic light guide are placed in thermal contact with the exit end 10 of rod 9. This permits heat generated at the fiber faces to be conducted axially back into glass rod 9, and then radially to the walls of thermal control bushing 21.

In FIG. 4, the cross section through section 44 of FIG. 3 may be seen in which fiber and 16 within ferrule 18 is in thermal contact with thermal control bushing 21, including cooling air flow passages 22 and cooling fins 23.

The described and illustrated embodiments of the present invention has been shown to accomplish basic purpose of the present invention; to provide a fiber optics illuminator in which the focussed energy energy falls substantially on the fiber bundle with minimal spillover losses, and with fiber operating temperatures within the fiber manufacturers' recommendations.

What is claimed is:

1. A fiber optics illuminator including:
    a source of illumination including heat on an optical axis, energized from a remote source of electrical power;
    an optical element coaxially disposed on the optical axis and focussing the illumination source at an image plane;
    a housing enclosing the source of illumination, the optical element and the image plane, said housing having an exit aperture;
    a thermal control bushing disposed coaxially on the optical axis of the source of illumination in the exit aperture of the housing, said bushing including an elongated, generally cylindrical homogeneous and transparent glass rod coaxially disposed on the optical axis at the image plane of the optical element, receiving illumination and heat, and a second end external to the housing, said thermal control bushing including a means for dissipating heat from the glass rod; and
    an elongated light guide comprising one or more optical fibers, including a light receiving end, coaxially disposed adjacent to the second end of the glass rod, and a remote light-emitting end.

2. A fiber optics illuminator according to claim 1 in which the second end of the glass rod is in a plane wherein the illumination is substantially out of focus.

3. A fiber optics illuminator according to claim 1 in which the glass rod includes a series of conjugate refocus planes spaced from the image plane at its first end, and having a length such that the illumination at its second end is substantially out of focus.

4. A fiber optics illuminator according to claim 1 in which the second end of the glass rod is thermally bonded to the receiving end of the fiber optics light guide with a heat conducting transparent medium.

5. A fiber optics illuminator according to claim 1 in which the glass rod provided with an infrared reflecting and visible light transmitting surface at its first end in the image plane.

6. A fiber optics illuminator according to claim 1 in which the glass rod is thermally bonded to the means for dissipating heat from said glass rod.

7. A fiber optics illuminator according to claim 1 in which the thermal control bushing includes a generally hollow tube of heat conducting metal having an inner diameter in thermal contact with a cylindrical external diameter of the glass rod and a outer heat radiating surface area.

8. A fiber optics illuminator according to claim 7 in which the thermal control bushing heat radiating surface area comprises a plurality of heat radiating fins.

9. A fiber optics illuminator according to claim 1 in which the thermal control bushing is aligned and contiguous with a passage through the housing.

10. A fiber optics illuminator according to claim 9 in which the passage through the housing has an inlet end external to the housing and an exit end within the housing, and a fan is included in the housing and draws air into the housing from the exit end of the passage and expels air from the housing through a ventilation hole in the housing.

11. A fiber optics illuminator according to claim 1 in which the first end of the glass rod is coaxially disposed in an aperture of a mirror, whereby illumination which does not impinge the first end of the glass rod is substantially reflected away from the glass rod by the mirror.

12. A fiber optics illuminator according to claim 11 in which the mirror is thermally isolated and axially spaced a distance from the illuminator housing.

* * * * *